United States Patent Office 3,553,667
Patented Jan. 5, 1971

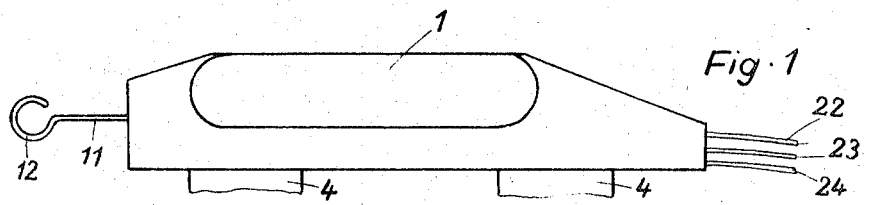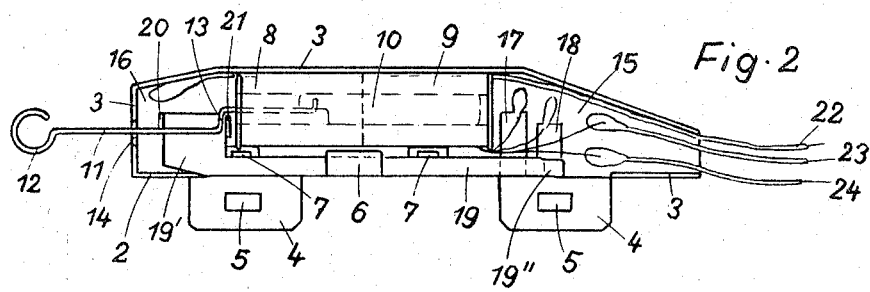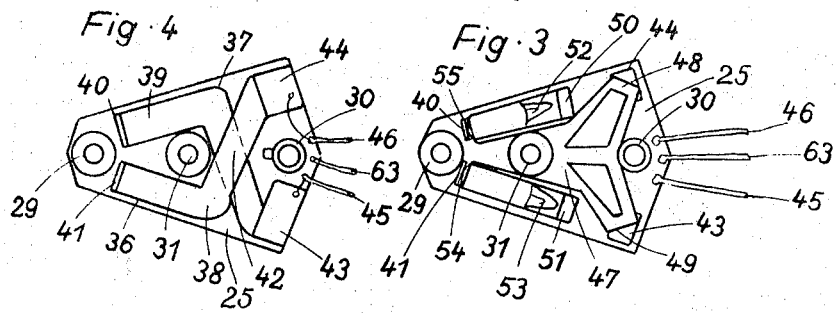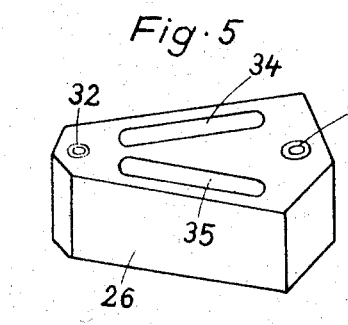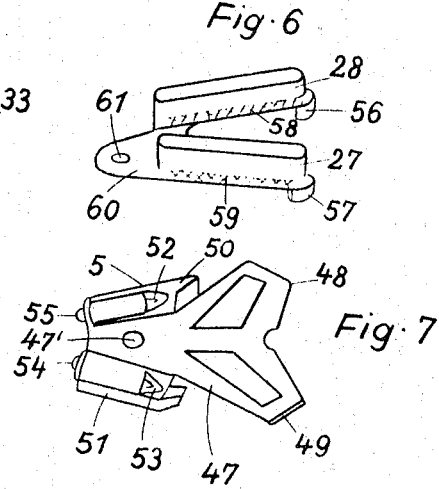

3,553,667
ELECTRIC REMOTE CONTROL DEVICE FOR SETTING SWITCHES AND SIGNALS OF TOY-MODEL-RAILROAD TRACK MEANS
Walter Münzberg, Muhlhausen-Sulz, Germany, assignor to Max Ernst, Nuremberg, Germany
Filed Apr. 8, 1968, Ser. No. 719,345
Claims priority, application Germany, Apr. 11, 1967, E 33,777
Int. Cl. B61l 5/12
U.S. Cl. 340—248                    6 Claims

ABSTRACT OF THE DISCLOSURE

Control arrangement, especially for the remote control of switches and the like for model railrods in which an armature is connected to the element to be moved and has two actuating coils associated therewith while a remote unit connected to the coils has a manual switch connected to each coil.

A further switch in series with each coil is operated into open position when the armature moves into the end position pertaining to the respective coil while an indicating lamp in series with each coil and the last mentioned switch is arranged adjacent the manual switch pertaining to the other coil.

---

The present invention relates to an electric adjusting device, especially for remote control of switches, signals and the like. It is known to equip electric toy and model railroad installations with remotely controllable switches and signal installations and to remotely control the same from a control center. To this end, the remote control center is equipped with manually operable switches, for instance in the form of key operable switches, by means of which the respective adjusting element associated with the individual switches, signals or the like is shifted. It is important in this connection that in particular with an installation comprising a multiplicity of switches and signals, the control center is in a position at any time to ascertain the position or status of the switches and signals. Where manually operable electric control switches are employed for the adjustment of such switches and signals, these electric control switches can be so designed that their position directly indicates the adjusted position of the respective railway switch or signal. Such an installation, however, does not assure that the respective adjusting element has actually been shifted in the respective railway installation because there is no return message received from the respective railway switch to the effect that the adjusting movement has been effected. Of course, it is also possible to provide such electric return message, for instance in such a manner that the movable part of the adjusting device actuates a contact which, in its turn turns on or off a respective signalling lamp in a suitable arrangement. Such a device, however, requires a relatively great number of electric conductors, viz. three conductors between the manually operable control switch and the adjusting device, and three additional conductors between the adjusting device and the indicating or signalling arrangement.

It is, therefore, an object of the present invention to provide an electric adjusting device, especially for the remote control of railway switches, signals, and the like for toy and model railway installations which will overcome the above-mentioned drawbacks.

It is another object of this invention to provide an electric adjusting device of the type set forth in the preceding paragraph which will be able, after each effected adjustment or shifting operation, to report to the control center that the adjusting or shifting operation has been effected, without employing an additional number of conductors or wires.

These and other objects and advantages of the invention will appear more clearly from the following specification in connection with the accompanying drawings, in which:

FIG. 1 shows an electromagnetic control element according to the invention, as seen from the top;

FIG. 2 is a bottom view of the control element of FIG. 1 with the covering hood removed therefrom;

Figure 8:
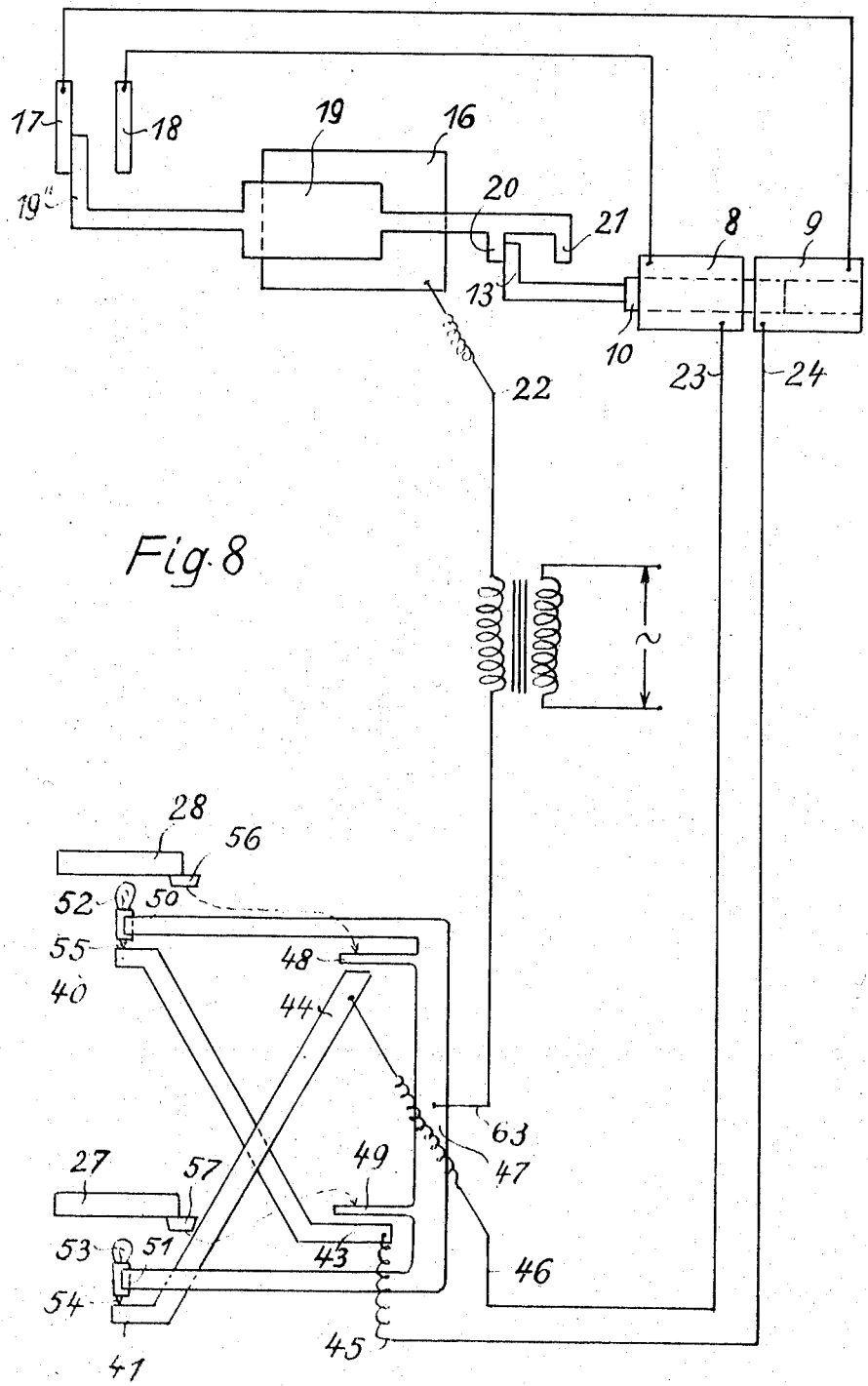

FIG. 3 diagrammatically illustrates the switch pertaining to the adjusting device of FIG. 1 after the cover hood has been removed, said switch being seen from the top;

FIG. 4 shows the switch of FIG. 3 after additionally the movable switch element has been removed;

FIG. 5 is an isometric view of the cover hood for the switches of FIGS. 3 and 4;

FIG. 6 is an isometric view of keys of transparent material for use in connection with the present invention; and FIG. 7 shows the movable switch element located below the keys and equipped with incandescent lamps.

FIG. 8 shows the whole control arrangement with the wiring in a diagrammatic view.

In conformity with the present invention, an electric control device, especially for remote control of switches and signals of toy and model railway installations is provided with an adjusting member on an adjusting device which adjusting member is displaceable by means of two coils and an iron core displaceable in said coils. Furthermore, the said electric adjusting device is provided with a manual switch for remote control. Each of the two coils has a resistor arranged in series therewith while said resistor is so dimensioned that when applying the operative voltage to the coil and resistor, still no adjusting operation of the adjusting member is effected. Furthermore, the manual switch is provided with contacts for short-circuiting said resistor while a reversing switch is provided the movable switch element of which is so coupled with play with the adjusting element of the adjusting device that at the end of the adjusting movement the respective coil bringing about said movement is disconnected from the voltage source, whereas the coil not used for the switching operation and the resistor pertaining thereto is placed under voltage, the resistors indicating the position of the adjusting member.

According to a further feature of the invention, the resistors which precede the coils may consist of incandescent lamps and are so arranged at the track control center that the respective lamp being lit will indicate the adjusted position of the respective railway switch or signal.

According to a further feature of the invention, the lamps indicating the respective position of the adjusting member on the adjusting device may be provided directly on or in the manual switch.

The arrangement according to the present invention is particularly advantageous for railway switch control means which are operated by keys and in which said keys are of a rod shape and are located at an acute angle with regard to each other at the top side of a preferably circular vector-shaped switch housing. According to the invention, the keys of the manual switch may consist of transparent, for instance reddish synthetic material while below each of the two keys an incandescent lamp is provided.

With the above-described manually operable switch, each of the two keys may have associated therewith a contact pair for short-circuiting the incandescent lamp. Advantageously, one of the keys has associated therewith the incandescent lamp of the other switch side so that when actuating the key the respective incandescent lamp therebelow will be lit. The coils of the adjusting device have to be so connected to the manual switch that the illuminated key will correspond to the respective adjusted railway switch or signal installation.

As mentioned above, the return message to the control center with regard to the effected adjustment is effected without additional wires. The arrangement according to the invention is also fool-proof so that no melting together of the coils of the adjusting device can occur.

Referring now to the drawings in detail, FIG. 1 shows the upper portion 1 of a housing made of sheet metal, said housing being adapted to be placed upon a bottom portion 2 (FIG. 2) likewise made of sheet metal. To this end, the top and bottom parts are provided with rectangularly folded margins 3. A portion of the margin at the bottom part forms laterally protruding ears 4 with rectangular openings 5, and serve for connecting the adjusting device to a railway switch not shown in the drawing. Another part of the margins forms holding flaps or ears 6, 7 for guiding a slide 19.

The device according to the invention furthermore comprises two serially arranged coils 8 and 9 the cavities of which have displaceably arranged therein a soft iron core 10. The left end side of the iron core 10 which is provided with a milled portion has suspended therein an actuating element 11 in the form of a wire the outer end of which forms an eye 12. The central portion of the actuating member 11 has a cranked section 13. The left end of the actuating member 11 protrudes from the opening 14 of the housing bottom part toward the outside. Any desired actuating member for actuating the railway switch or signal may be connected to the eye 12. The bottom of the housing 1 is filled by an insulating plate 15 which at its left end is covered by a metal plate 16. On the right-hand side of the two coils 8 and 9 there are provided two metal plates 17, 18. Between the two coils 8 and 9 and the ear 6 there is located a slide 19 which extends through two additional ears 7. This slide 19 has its left end provided with a rectangular part 19' which carries upwardly angled-off ears 20, 21. The right-hand end of the slide 19 forms a resilient tongue 19". By means of the part 19', the slide continuously engages the contact plate 16, and by means of the tongue 19" the slide engages alternately either the contact plate 17 or the contact plate 18. Soldered to the contact plate 16 is an insulated wire 22 which leads to an alternating current pole of a transformer (not illustrated). The contact plates 17, 18 are soldered to the two wire ends of the two coils 8 and 9. The other two ends of said coils 8 and 9 are soldered on the insulating plate 15 to the outwardly leading insulated wires 23 and 24.

FIG. 2 illustrates the soft iron core 10 in its right-hand end position so that the slide 19 connects the plate 16 which is connected to line 22, with the plate 18. The second end of the coil 8 having one end connected to said plate 18 is connected, for instance, with the feed line 23. In its left-hand end position of slide 19, the latter connects the feed line 22 with the plate 17 which leads to a connection with the coil 9. The second feed line to the coil 9 is soldered to line 24.

The crank 13 on the wire 11 is located between the two abutments 20 and 21 and, more specifically, with such a play or lost motion that when the arrangement is shifted or reversed, at the end of the respective shifting operation, the crank will abut the abutments 20 or 21 whereby the slide 19 is shifted from plate 18 to plate 17, or vice versa.

The adjusting member shown in FIGS. 1 and 2 is adapted to be actuated by a reversing switch of vector-shaped contour which is provided with keys the bottom part 25 of which may preferably consist of ceramic or synthetic material. A hood 26 preferably of synthetic material is adapted to be placed upon said bottom part 25. The hood 26 has oblong openings 34, 35 defining an acute angle with each other and providing the openings through which the keys 27, 28 can pass in downward direction. The top side of the lower part 25 is provided with cylindrical extensions 29, 30 and 31 of which the extensions 29 and 30 are provided with threaded bores for screwing on the hood 26 which in its turn has countersunk bores 32, 33. The central cylindrical extension 31 serves for fixing the location of a reverse switch plate 47. The lower part 25 is provided with trough-shaped recesses 36, 37 for receiving band or strip-shaped conductor elements 38, 39. The left ends of these conductor elements 38, 39 are provided with upwardly extending resilient contact tongues 40, 41. The two conductor parts 38, 39 cross each other at 42 and at the wider end of the switch form stationary contacts 43, 44. These contacts 43, 44 are soldered to outwardly leading insulated conductors 45, 46.

As will be seen from FIGS. 3 and 7, a contact plate 47 is located above the bottom part 25 provided with the conductor parts 38, 39. The said contact plate 47 is by means of a round opening 47' held on a pivot 31. The two wing-shaped ends 48, 49 of plate 47 form resilient contacts. Furthermore, the said contact plate 47 is provided with two pans 50, 51 forming an acute angle with each other which serve as socket for incandescent lamps 42, 43 to be inserted therein. The resilient contact tongues 40, 41 are in contact with the central pole 54, 55 of the incandescent lamps.

For locating the position of the two keys 27, 28, the same have their bottom side provided with extensions 56, 57 and furthermore have their bottom side provided with a knurled area 58, 59. The said two keys 27, 28 are interconnected by an ear 60 which is provided with a bore 61. This bore likewise serves for locating the keys on the housing upper part 26.

The bottom side of the contact plate 47 has soldered thereto an insulated conductor 63 which leads to the second pole of the transformer. The two conductors 45, 46 are in a suitable manner connected to the conductors 23, 24 of the adjusting member illustrated in FIG. 2. The operation of the adjusting device shown in the drawing is as follows:

Inasmuch as the lamps 52, 53 with their sockets are conductively connected to the contact plate 47 and since their central poles 54, 55 through resilient tongues 40, 41 are in an exchanged manner conductively connected to the fixed contacts 43, 44, it will be appreciated that by actuating the key 27, the lamp 52 can be short-circuited, whereas by actuating the key 28 the lamp 53 can be short-circuited. Since on the other hand through conductors 45, 46 and 23, 24 respectively the two lamps 51 and 52 are in series with one of the coils 8, 9, it will be appreciated that by short-circuiting the said lamps, instead of a partial voltage, the full voltage can be placed on one of the two coils 8, 9. The voltage drop at said lamps has to be so selected that as long as the respective lamp is in series with the coil, the latter will not yet be in position to move the iron core 10 into its other position. The current intensity occurring in connection therewith must be so low that it can be absorbed by the coil without difficulty as permanent load. It will thus be seen from the drawing that when actuating the respective non-illuminated key, the said key will be illuminated by the lamp therebelow when the slide 19 has reached its other end position. The slide 19 thus always shortly prior to the completion of the adjusting movement prepares the installation so that by actuation of the other key, the respective turned on lamp will be short-circuited while the lamp which was not turned on up to that time would be placed under voltage. Thus, the device operates with a return message without requiring additional wires.

With the key switch shown in FIGS. 3–7, following the actuation of the respective key, the contact between the fixed contact aparts 43, 44 and the movable contact parts 48, 49 is disengaged. As a result, also if the reversing device should with a permanent contact stick, the switched on coil while being retained under voltage will be turned off when relieving the key so that also in case of such failure of operation a melting of the coil cannot occur.

It is, of course, to be understood, that the present invention is, by no means, limited to the particular arrangement shown in the drawing, but also comprises any modifications within the scope of the appended claims.

I claim:

1. A control device especially adapted for effecting remote control of the moveemnt of switches, signals and the like, of model railroad installations and comprising: a moveable armature adapted for connection to the element to be moved, first and second coils operatively associated with said armature and individually energizable for moving the armature into respective first and second end positions, a source of electrical energy for said coils; a first normally open manual switch in series with said source and said first coil, a second normally open manual switch in series with said source and said second coil, a reversing switch comprising a blade in series with each said coil and each blade being opened in response to movement of the armature into the end position corresponding to the coil in series with the respective blade while simultaneously the other of the blades closes, a resistive indicating means connected in parallel with each said manual switch, each resistive indicating means having such resistance that the current which flows therethrough and through the respective coil connected thereto when the blade of the reversing switch pertaining to the respective coil is closed is not sufficient to cause movement of said armature, said resistive indicating means being in the form of incandescent lamps so that the one of said lamps which is illuminated will indicate the end position which the armature occupies, said first and second manual switches being combined in a unit remote from said coils, said lamps being carried by said unit, said first and second manual switch having a bar-like actuator on said unit, each actuator being capable of transmitting light, and each said lamp being carried by said unit beneath a respective said actuator, said unit comprising a housing having a top wall, two slots in said top wall which are inclined at an angle to each other, said actuators projecting through said slots and being moveable therein in a direction perpendicular to the plane of said top wall, means connecting one and the same ends of said actuators to said housing, and means projecting from the other ends of said actuators inside said housing for engagement with the underside of said top wall to limit the upward movement of said actuators in said slots.

2. A device according to claim 1 in which the sides of said bar-like actuators are knurled.

3. A device according to claim 1 in which the lamp bypassing each manual switch is located beneath the actuator pertaining to the other manual switch so that illumination of an actuator by the lamp therebeneath indicates that the armature is in the end position corresponding to that actuator.

4. A device according to claim 3 in which said unit comprises a base member of electrical insulating material, first and second stationary contacts on said base pertaining to said first and second manual switches respectively, a conductive member common to said first and second manual switches and having first and second contact regions selectively engageable with said first and second stationary contacts respectively, said actuators positioned adjacent respective ones of said contact regions, and each lamp being positioned beneath a respective actuator and having one of its terminals connected to said common conductive member and its other terminal connected to the stationary contact pertaining to the other actuator, said stationary contacts being mounted on respective conductive strips which are mounted on said base so as to cross over each other.

5. A device according to claim 1 in which said reversing switch comprises a pair of spaced contacts with one connected to each coil and a third contact between said spaced contacts, and a lost motion connection between said third contact and said armature so the armature will move said third contact out of engagement of one of said spaced contacts and into engagement with the other of said spaced contacts only as the said armature approaches its end positions.

6. A device according to claim 4 in which said common conductive member is formed with resilient trough regions which receive the bases of said lamps so as to support said lamps while simultaneously making contact with the said one terminals thereof, the other terminals of said lamps being exposed, and resilient tongues upstanding from said strips and engaging the other terminals of said lamps.

References Cited

UNITED STATES PATENTS

| 2,202,546 | 5/1940 | Bonanno | 246—220 |
| 2,297,131 | 9/1942 | Bonanno | 246—415A |
| 3,361,906 | 1/1968 | Guthrie | 200—167A |

FOREIGN PATENTS

| 812,175 | 8/1951 | Germany | 246—415A |
| 1,015,129 | 12/1965 | Great Britain | 200—167A |

DONALD J. YUSKO, Primary Examiner

D. MYER, Assistant Examiner

U.S. Cl. X.R.

200—167; 246—217